United States Patent [19]

Wild et al.

[11] Patent Number: 5,203,165
[45] Date of Patent: Apr. 20, 1993

[54] METHOD FOR THE LAMBDA CONTROL OF AN INTERNAL COMBUSTION ENGINE HAVING A CATALYZER

[75] Inventors: Ernst Wild, Oberriexingen; Günther Plapp, Filderstadt; Lothar Raff, Remseck; Michael Westerdorf, Moeglingen; Eberhard Schnaibel, Hemmingen, all of Fed. Rep. of Germany

[73] Assignee: Robert Bosch GmbH, Stuttgart, Fed. Rep. of Germany

[21] Appl. No.: 738,360

[22] Filed: Jul. 31, 1991

[30] Foreign Application Priority Data

Jul. 31, 1990 [DE] Fed. Rep. of Germany ....... 4024210

[51] Int. Cl.⁵ .............................................. F01N 3/20
[52] U.S. Cl. ......................................... 60/274; 60/276; 60/277; 60/285; 60/299
[58] Field of Search ................... 60/274, 276, 277, 285

[56] References Cited

U.S. PATENT DOCUMENTS

| | | | |
|---|---|---|---|
| 3,882,451 | 5/1975 | Fujishiro et al. | 340/57 |
| 3,962,866 | 6/1976 | Neidhard et al. | 60/276 |
| 4,622,809 | 11/1986 | Abthoff et al. | 60/274 |
| 4,819,427 | 4/1987 | Nagai et al. | 60/274 |
| 4,884,066 | 11/1989 | Miyata et al. | 60/277 |
| 5,018,348 | 5/1991 | Dürschmidt et al. | 60/274 |
| 5,070,692 | 12/1991 | Nada | 60/274 |
| 5,077,970 | 1/1992 | Hamburg | 60/274 |

FOREIGN PATENT DOCUMENTS 3500594  7/1986  Fed. Rep. of Germany .

Primary Examiner—Ira S. Lazarus
Assistant Examiner—L. Heyman
Attorney, Agent, or Firm—Walter Ottesen

[57] ABSTRACT

The invention is directed to a method for lambda control of an internal combustion engine having a catalyzer and a measuring probe arrangement in front of the catalyzer for emitting a measuring signal and a testing probe arrangement behind the catalyzer for emitting a test signal. The method includes the steps of: forming a ratio between the measuring signal and the test signal at pregiven operating conditions; evaluating said ratio as an estimating quantity for the conversion rate of the catalyzer; and, modifying output values of control parameters in a pregiven controlled manner on the basis of the instantaneous values of said ratio, said output values being applicable for controlling an internal combustion engine having a new catalyzer. This method affords the advantage that it evaluates a catalyzer with the aid of the above-mentioned ratio value and controllably modifies values of control parameters in dependence upon the evaluation ratio. This leads to an especially stable control with low toxic gas discharge.

8 Claims, 2 Drawing Sheets

METHOD FOR THE LAMBDA CONTROL OF AN INTERNAL COMBUSTION ENGINE HAVING A CATALYZER

FIELD OF THE INVENTION

The invention relates to a method for the lambda control of an internal combustion engine having a catalyzer. Methods of this kind only function effectively to reduce pollutants as long as the catalyzer has an adequate conversion rate, which, however, deteriorates with increasing age.

BACKGROUND OF THE INVENTION

U.S. Pat. No. 3,962,866 discloses a two-step lambda control method wherein the difference is formed between the signals of a probe ahead of the catalyzer and another probe behind the catalyzer. As long as the catalyzer is still new, the signal supplied by the rearward probe hardly oscillates notwithstanding the oscillation which can be seen at the forward probe because of the two-step control. The difference between the two signals takes on ever increasing values. When the catalyzer exhibits a deteriorating conversion with increasing age, then the rear probe also measures an oscillation of the lambda value. For this reason, the maximum difference between the signals from the two probes becomes increasingly less with increasing catalyzer age. A warning signal is emitted when this difference drops below a threshold value. The signal from the rearward probe is not utilized for control purposes.

German published patent application DE 3,500,594 A1 and U.S. Pat. No. 4,622,809 disclose two-step lambda control methods which have measurement signals from a measurement probe arrangement ahead of the catalyzer for controlling the lambda value and residual signals from a test lambda probe behind the catalyzer for evaluating the conversion rate of the catalyzer. The control parameters with which the two-step control is driven are continuously so adjusted that the amplitude of the test signal is minimal and the mean value of the test signal moves in a pregiven range. A fault signal is emitted when the minimal attainable amplitude of the test signal exceeds a threshold value or when the mean value of the test signal moves out of the pregiven window. The fault signal indicates that the catalyzer no longer adequately performs its function.

U.S. Pat. No. 4,884,066 discloses a system wherein a warning signal is then emitted when the amplitude of the signal of a probe behind the catalyzer becomes too high. In this method, there is therefore no investigation as to whether a large signal amplitude of the probe behind the catalyzer is caused by a large lambda value amplitude ahead of the catalyzer. This method is therefore the simplest of those described but is also the method most prone to error. The signal of the probe behind the catalyzer is not utilized for open-loop or closed-loop control purposes; instead, the signal is only used to generate the above-mentioned warning signal.

German published patent application DE 3,500,594 A1 and U.S. Pat. No. 4,622,809 describe methods which can relatively easily lead to control oscillations which are difficult to control because of the feedback in the lambda control loop and the feedback in the test signal loop which acts on the lambda control loop via the control parameters. This is especially then the case when, because of a disturbance, the amplitude of the test signal is temporarily relatively large. Then, the values of the control parameters are so changed that only low amplitudes are present ahead of the catalyzer and therefore also behind the catalyzer. The control becomes more sluggish in this way whereby it is more difficult to eliminate the disturbance which has caused this effect. In this way, an especially large deviation from the desired value in the lambda control loop can settle in because of the action of the test signals which indeed should be prevented. The advantage of being able to limit the amplitudes of control oscillations with increasing catalyzer age is connected with the disadvantage that unnecessarily high control deviations can develop because of the overall sequence of the method as long as it is not necessary to change the control parameters in view of the excellent operation of the catalyzer.

SUMMARY OF THE INVENTION

It is an object of the invention to provide a method for the lambda control of an internal combustion engine having a catalyzer wherein the aging condition of the catalyzer is monitored and especially low toxic gas discharge takes place over the service life of the catalyzer.

The method of the invention is for lambda control of an internal combustion engine having a catalyzer and a measuring probe arrangement in front of the catalyzer for emitting a measuring signal and a testing probe arrangement behind the catalyzer for emitting a test signal. The method includes the steps of: forming a ratio between the measuring signal and the test signal at pregiven operating conditions; evaluating the ratio as an estimating quantity for the conversion rate of the catalyzer; and, modifying output values of control parameters in a pregiven controlled manner on the basis of the instantaneous values of the ratio, the output values being applicable for controlling an internal combustion engine having a new catalyzer.

This method is different in two respects from the method described above. The first difference is seen in that there is not the amplitude of the signal of a test lambda probe which is used as a quantity for changing control parameters; rather, that the ratio of the test signal emitted by the test probe arrangement to the measurement signal emitted by the measurement probe arrangement is formed or vice versa. These probe arrangements are preferably realized with lambda probes. The test signal and measurement signal can be amplitude values or mean values or preferably mean deviations of mean values either, for example, linear deviations or mean quadratic deviations. The formation of the test signal to the measurement signal precludes that a large test signal could become effective to modify the control parameters. This large test signal is not caused by a poor conversion, rather by a large measurement signal. If the test signal is only large because the measurement signal is large, then these effects hardly act on the formed evaluation ratio applied for the modification. In order to be sure that the formed ratio provides information, it is advantageous to form this ratio only when specific operating conditions are present and/or when the measurement signal does not exceed a threshold. A preferred operating condition for obtaining the evaluation ratio is a steady-state operating point for a catalyzer which has warmed to its operating temperature. In steady-state operation, the value of a manipulated variable used with the aid of the measuring signal to control is essentially proportional to the measurement signal. For this reason, the value of the manipulated variable can be used as a measuring signal when forming the ratio of the measurement signal to the test signal.

The second difference with respect to the above-mentioned prior art method is seen in that with the method of the invention, the control parameters in the lambda control loop are not closed-loop controlled but rather adjusted via open-loop control. The control parameters are not modified in a direction toward a minimum test signal; rather, the above-mentioned evaluation ratio is used as a criterion for the age of the catalyzer and, with the aid of this criterion, the control parameters are modified in a pregiven manner.

This modification is made preferably so that first control parameters are determined as they are optimal for lambda control with a new catalyzer. Thereafter, optimal control parameters are fixed for respective catalyzers of different ages measured with the above-mentioned evaluation ratio. Modifying values are stored in one or more characteristics which provide the relationship between values of the evaluation ratio and the values of the measured control parameters to the particular evaluation ratio value. During operation of an internal combustion engine, original values for the control parameters are read out from a characteristic field in dependence upon operating point and these values are then modified by the modifying values as they are read out from the one or more characteristics in dependence upon the instantaneous value of the evaluation ratio.

According to another feature of the invention, an error signal is emitted when the instantaneous value of the evaluation ratio exceeds an error threshold value. It is advantageous to set this threshold value so that it is possible for a certain time to adapt the control parameters to the converting capacity of the catalyzer which is deteriorating further.

As mentioned above, it is advantageous to utilize mean deviations of the signal mean value of a particular probe as the measurement and test signals, respectively. If the probes are lambda probes, it is advantageous to convert the voltage signals emitted by the probes into lambda values with the aid of voltage-lambda characteristics before the measurement and test signals are computed. This affords the advantage that values are obtained which are comparable to each other even for different operating points.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
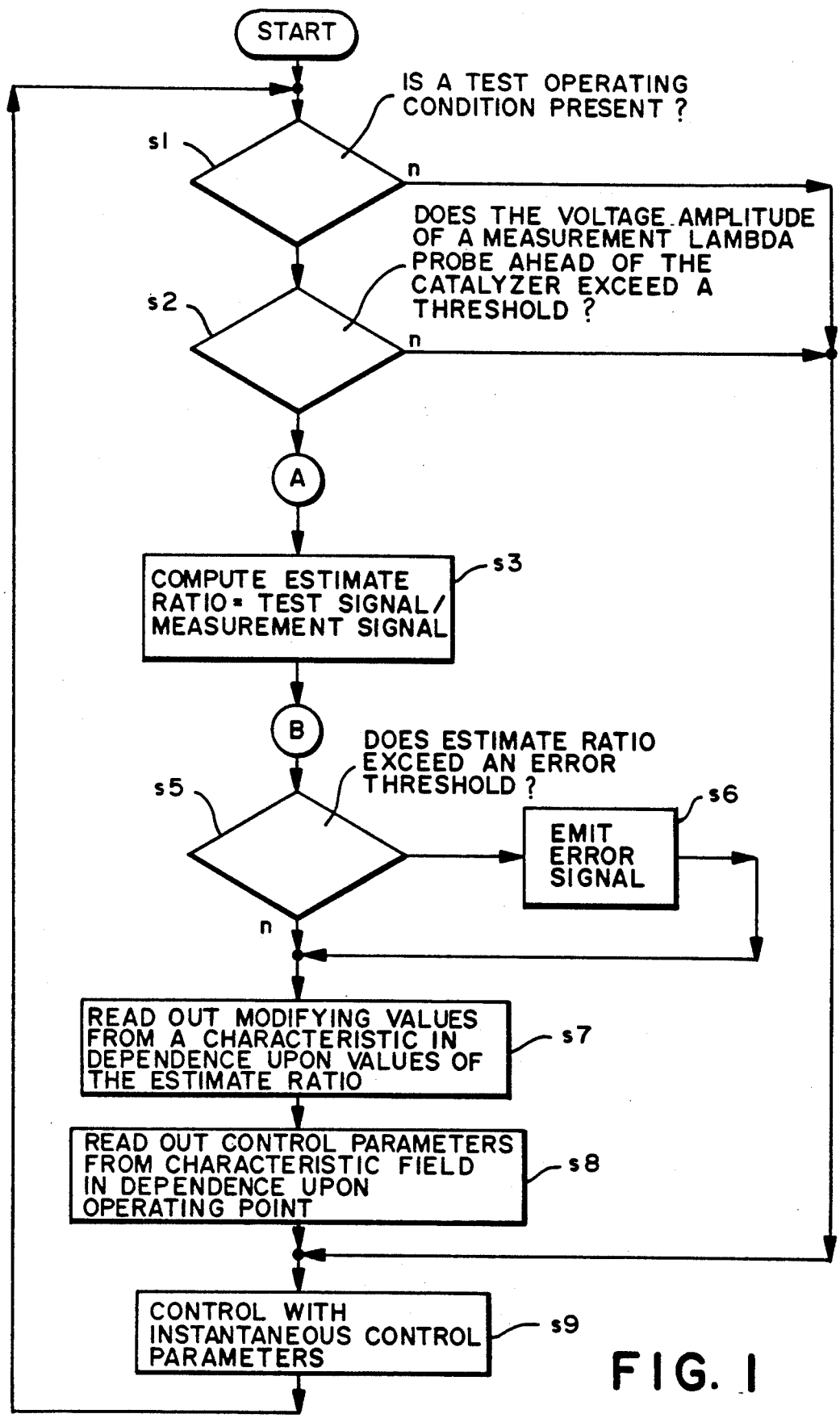
FIG. 1 is a flowchart for explaining an embodiment of the method of the invention for lambda control which uses values of a variable with which the age of a catalyzer can be estimated.

In the method shown in FIG. 1, a check is made in step s1 as to whether a test operating condition is present in which an estimate ratio can be reliably formed which is an index for the aging condition of a catalyzer. A preferred test operating condition is a steady-state load/engine-speed point with a catalyzer which is operationally warm. A steady-state load/engine-speed point is then present in a known manner when load and engine speed move within pregiven limits and/or pregiven rates of change over a pregiven time interval. If no test operating condition is present, then the method sequence goes directly to the last step s9 in accordance with which control is effected with the instantaneous control parameters. If in contrast, a test operating condition is present, then an investigation is made in step s2 as to whether the voltage amplitude of a measuring lambda probe ahead of the catalyzer exceeds a threshold. If this is indeed the case, then the method proceeds on the premise that a special condition with an excessively large control oscillation is present in which it is not practical to form an estimate ratio. Accordingly, the above-mentioned step s9 then likewise follows. Otherwise, a step s3 lying between the two marks A and B is reached wherein a measurement signal is determined from the voltages emitted by the measuring lambda probe and a test signal is determined from voltages emitted by a test lambda probe behind the catalyzer. The manner in which this takes place is explained below with reference to the sequence shown in FIG. 2.

The ratio of the test signal Sh to the measurement signal Sv is computed thereafter in step s3 as a quantity for estimating the conversion rate of the catalyzer. If it develops in step s5 that this estimate ratio exceeds an error threshold, this is an indication that the catalyzer has aged to an impermissible degree. An error signal (step s6) is therefore emitted. Independently of whether an error signal is to be emitted or not, a step s7 follows in which modifier values are read out of a characteristic which stores these modifier values, which are addressable via values of the above-mentioned estimate ratio. Control parameters are read out of the characteristic field in dependence upon operating point (step s8).

The characteristic field is, for example, addressable via actual values of engine speed and load. The read-out values of the control parameters are modified with the aid of the modifier values. For example, the P-component of a two-step control is lowered with an increasingly large estimate ratio or the integration time constant is increased. The value of the manipulated variable can be multiplied by a factor deviating from one toward increasingly lower values. For continuous lambda control, the amplitude of an external oscillation can be increasingly reduced which is coupled into the control loop. The use of such an external oscillation is advantageous since it has been shown that a catalyzer converts better continuously about a mean value of changing exhaust gas composition than with an exhaust gas composition which continuously exhibits essentially the mean value.

If the new values are determined by control parameters, then step s9 already mentioned follows wherein the control takes place with the actual parameters.

Figure 2:
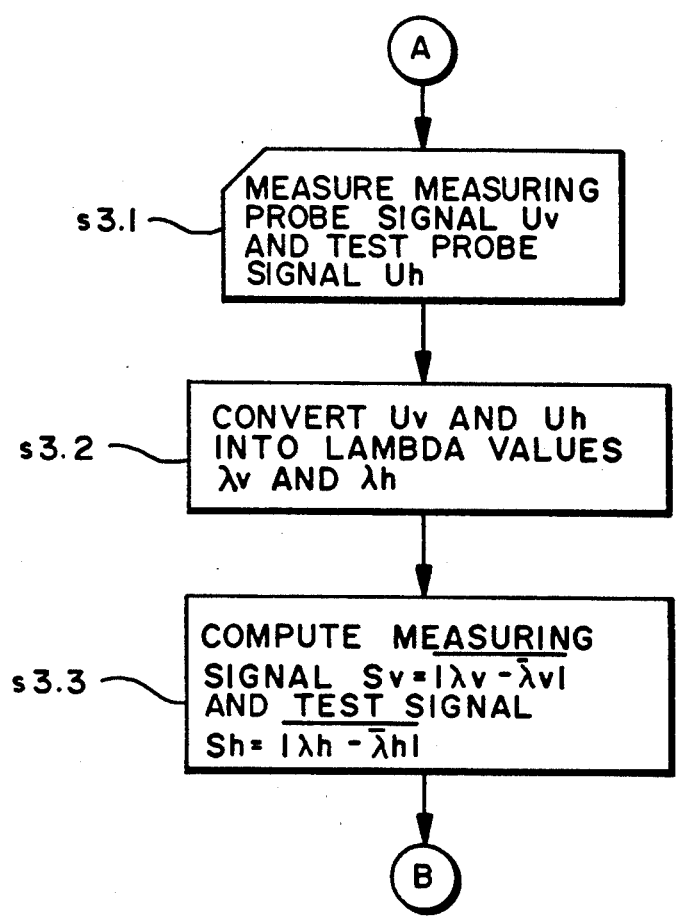
FIG. 2 is a component flowchart for explaining how values for the estimation variable are obtained utilizing the method of FIG. 1.

As already mentioned above, it will now be explained with reference to FIG. 2 how the measurement signal and the test signal are obtained in step s3. In a step s3.1, the probe voltage Uv of a measurement lambda probe ahead of the catalyzer and the probe voltage Uh of a test lambda probe behind the catalyzer are measured. These values are converted with the aid of a voltage-lambda value characteristic line into respective lambda values $\lambda v$ and $\lambda h$ (step s3.2). In this way, a linearization is obtained which leads to the condition that all measured values having approximately the same weighting go into the computation for an averaging performed in the subsequent step s3.3 which otherwise would not be the case because of the very nonlinear signal response of a lambda probe. Furthermore, the value of the ratio of a test signal to a measurement signal is then dependent essentially only on the conversion rate of the catalyzer and not also on the particular lambda mean value. The measurement signal Sv just mentioned is formed in step s3.3 in that the mean amount deviation of the value $\lambda v$ from the mean value of $\lambda v$ is formed. A corresponding computation is carried out with the signals $\lambda h$ to obtain the test signal Sh. In lieu of this type of mean value formation, a computation could for example also take place in accordance with the method of the mean quadratic error deviation.

Also the amplitudes of probe signals can be used as test signal and measurement signal. However, it has been shown that the mean value formations of the kind described above lead to signals which are hardly subjected to disturbances.

Figure 3A:
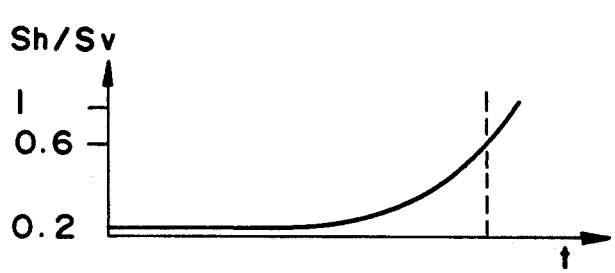
FIG. 3a is a diagram showing how the value of the estimate ratio increases with increasing aging time of a catalyzer; and, FIG. 3b shows how a modifier value is lowered in correlation thereto.

FIG. 3a shows how the estimate ratio Sh/Sv changes in the course of the service life (t) of a catalyzer. First, hardly an oscillation of the test signal occurs behind the catalyzer so that the mean deviation from the mean amount is practically zero. This capability to almost completely convert toxic gases is shown by a new catalyzer also then when the lambda control method is carried out with such large amplitudes of the control oscillations that running disturbances occur in the controlled internal combustion engine. However, when the catalyzer ages, then the amplitudes of the control oscillations have to be reduced so that the catalyzer can still adequately convert. If the catalyzer has become fully unusable, practically the same oscillations occur at its output in the toxic gas concentration as at its input. The ratio Sh/Sv then takes on the value 1. In FIG. 3a, the ratio value 0.6 is emphasized. This relates to an error threshold. When the above-mentioned ratio exceeds this threshold, an output of the error signal takes place in accordance with step s6 of FIG. 1. It is here noted that the ratio value 0.6 does not state that the conversion rate of the catalyzer is 40%. The relationship between the conversion rate and the above-mentioned estimating ratio is greatly nonlinear.

Figure 3B:
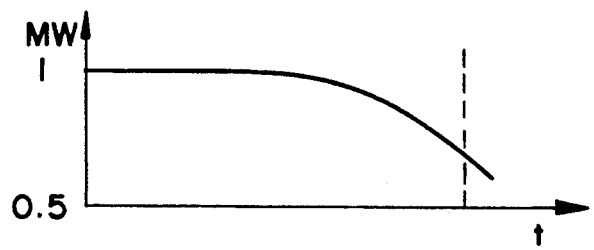

FIG. 3b shows how the modifier value MW is reduced with a deteriorating ratio Sh/Sv with the modifier value MW being read out of the characteristic memory mentioned above in connection with step s7 of FIG. 1.

In the embodiments described, the premise was taken that the measuring probe arrangement and the test probe arrangement each include a lambda probe. These probe arrangements can, however, also be equipped with probes which measure the concentration of toxic gases directly. However, at the present state of the art, such probes are very complicated and expensive. If such probes are utilized, then the conversion rate could be determined directly by the ratio value formation described. This conversion rate would be used as an estimate ratio in the sense described above, that is, it would be applied to modify control parameters.

As already mentioned above, the danger of the occurrence of unwanted large control oscillation amplitudes with the methods of the invention is reduced when compared to the known method because optimal values for the control parameters are not adjusted with a control strategy, rather, such values are pregiven in dependence upon the age of the catalyzer with the age being specified with the aid of the known estimation ratio. However, there can still be a certain residual danger of undesired large control oscillations with this procedure, namely, when the values of the control parameters are readjusted continuously with each small determined change. In order to avoid this danger, it is advantageous to modify the control parameters only in the case of large pregiven changes of the estimate ratio.

It is understood that the foregoing description is that of the preferred embodiments of the invention and that various changes and modifications may be made thereto without departing from the spirit and scope of the invention as defined in the appended claims.

What is claimed is:

1. A method for lambda control of an internal combustion engine having a catalyzer and a measuring probe arrangement in front of the catalyzer for emitting a measuring signal which is utilized for regulating the air/fuel ratio applied to the engine and a testing probe arrangement behind the catalyzer for emitting a test signal, the lambda control including a lambda control loop utilizing a plurality of control parameters, said lambda control loop imparting a control oscillation having an amplitude, the method comprising the steps of:
   forming a ratio of a value based on the measuring signal and another value based on the test signal when one or more pregiven engine operating conditions are met, said ratio having an instantaneous value;
   evaluating said ratio as an estimating quantity for a conversion rate of the catalyzer; and,
   modifying said control parameters in the lambda control loop in a pregiven controlled manner on the basis of the instantaneous values of said ratio thereby reducing said amplitude of said control oscillation in the control loop with decreased conversion rate of the catalyzer.

2. The method of claim 1, wherein one of said pregiven engine operating conditions is a steady-state load-speed point for which the catalyzer is operationally warm.

3. A method for lambda control of an internal combustion engine having a catalyzer and a measuring probe arrangement in front of the catalyzer for emitting a measuring signal and a testing probe arrangement behind the catalyzer for emitting a test signal, the lambda control including a lambda control loop utilizing a plurality of control parameters, the method comprising the steps of:
   forming a ratio between a value based on the measuring signal and another value based on the test signal when one or more pregiven engine operating conditions are met, said ratio having an instantaneous value;
   evaluating said ratio as an estimating quantity for a conversion rate of the catalyzer;
   modifying said control parameters in a pregiven controlled manner on the basis of the instantaneous values of said ratio, the control parameters being applicable for controlling an internal combustion engine having a new catalyzer; and not forming said ratio when said measuring signal exceeds a threshold.

4. A method for lambda control of an internal combustion engine having a catalyzer and a measuring probe arrangement in front of the catalyzer for emitting a measuring signal and a testing probe arrangement behind the catalyzer for emitting a test signal, the lambda control including a lambda control loop utilizing a plurality of control parameters addressable via operating conditions of the engine and a plurality of modifier values addressable via a conversion rate of the catalyzer, the method comprising the steps of:

forming a ratio between the measuring signal and the test signal when one or more pregiven engine operating conditions are met, said ratio having an instantaneous value;

evaluating said ratio as an estimating quantity for the conversion rate of the catalyzer;

modifying said control parameters in a pregiven controlled manner by said modifier values corresponding to the instantaneous value of said ratio thereby forming a plurality of modified control parameters; and, controlling the engine on the basis of said modified control parameters.

5. A method for lambda control of an internal combustion engine having a catalyzer and a measuring probe arrangement in front of the catalyzer for emitting a measuring signal and a testing probe arrangement behind the catalyzer for emitting a test signal, the lambda control including a lambda control loop utilizing a plurality of control parameters, the method comprising the steps of:

forming a ratio between a value of the measuring signal and another value based on the test signal when one or more pregiven operating conditions are met, said ratio having an instantaneous value;

evaluating said ratio as an estimating quantity for a conversion rate of the catalyzer;

modifying said control parameters in a pregiven controlled manner on the basis of the instantaneous values of said ratio, the control parameters being applicable for controlling an internal combustion engine having a new catalyzer; and, emitting an error signal when the instantaneous value of the estimate ratio exceeds an error threshold.

6. A method for lambda control of an internal combustion engine having a catalyzer and a measuring probe arrangement in front of the catalyzer for emitting a measuring signal and a testing probe arrangement behind the catalyzer for emitting a test signal, the lambda control including a lambda control loop utilizing a plurality of control parameters, the method comprising the steps of:

forming a ratio between a value of the measuring signal and another value based on the test signal at pregiven operating conditions;

evaluating said ratio as an estimating quantity for a conversion rate of the catalyzer;

modifying said control parameters in a pregiven controlled manner on the basis of the instantaneous values of said ratio, the control parameters being applicable for controlling an internal combustion engine having a new catalyzer; and, using mean amount deviations of signal amount mean values of respective probes as a measuring signal and as a test signal, respectively, with said probes being present within respective probe arrangements.

7. The method of claim 6, said probe being lambda probes and the voltage signals emitted by said lambda probes are converted into lambda values with the aid of voltage-lambda value characteristics.

8. A method for lambda control of an internal combustion engine having a catalyzer and a measuring probe arrangement in front of the catalyzer for emitting a measuring signal and a testing probe arrangement behind the catalyzer for emitting a test signal, the lambda control including a lambda control loop utilizing a plurality of control parameters, the method comprising the steps of:

forming a ratio between a value of the measuring signal and another value based on the test signal at pregiven operating conditions;

evaluating said ratio as an estimating quantity for a conversion rate of the catalyzer; modifying said control parameters in a pregiven controlled manner on the basis of the instantaneous values of said ratio, the control parameters being applicable for controlling an internal combustion engine having a new catalyzer; and only changing said control parameters when the particular value of the estimate ratio differs from the previously detected value by more than a pregiven difference.

* * * * *

UNITED STATES PATENT AND TRADEMARK OFFICE
CERTIFICATE OF CORRECTION

PATENT NO.  : 5,203,165
DATED       : April 20, 1993
INVENTOR(S) : Ernst Wild, Günther Plapp, Lothar Raff,
              Michael Westerdorf and Eberhard Schnaibel It is certified that error appears in the above-identified patent and that said Letters Patent is hereby corrected as shown below:

In column 6, line 28:  delete "applied" and substitute -- supplied -- therefor.

In column 7, line 3:  after "and", insert -- , --.

In column 8, line 24:  delete "probe" and substitute -- probes -- therefor.

In column 8, line 45:  after "and", insert -- , --.

Signed and Sealed this

Eleventh Day of January, 1994

Attest:

BRUCE LEHMAN

*Attesting Officer*    *Commissioner of Patents and Trademarks*